United States Patent
Park

(10) Patent No.: US 10,418,064 B2
(45) Date of Patent: *Sep. 17, 2019

(54) CONTENT PLAY DEVICE HAVING CONTENT FORMING FUNCTION AND METHOD FOR FORMING CONTENT THEREOF

(71) Applicant: SAMSUNG ELECTRONICS CO., LTD., Suwon-si (KR)

(72) Inventor: Jung-il Park, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 900 days.

This patent is subject to a terminal disclaimer.

(21) Appl. No.: 14/842,373

(22) Filed: Sep. 1, 2015

(65) Prior Publication Data

US 2015/0371680 A1 Dec. 24, 2015

Related U.S. Application Data

(63) Continuation of application No. 12/549,830, filed on Aug. 28, 2009, now Pat. No. 9,153,285.

(30) Foreign Application Priority Data

Dec. 1, 2008 (KR) .......................... 10-2008-0120494

(51) Int. Cl.
*G11B 27/34* (2006.01)
*G06F 3/0484* (2013.01)
(Continued)

(52) U.S. Cl.
CPC .......... *G11B 27/031* (2013.01); *G06F 3/0484* (2013.01); *G11B 27/034* (2013.01); *G11B 27/34* (2013.01)

(58) Field of Classification Search
CPC .......... G06T 13/00; G06T 2207/10016; G10H 2220/106; G10H 1/368; G10H 2220/091
See application file for complete search history.

(56) References Cited

U.S. PATENT DOCUMENTS 5,315,057 A 5/1994 Land et al.
5,355,762 A 10/1994 Tabata
(Continued)

FOREIGN PATENT DOCUMENTS

JP 11-273320 A 10/1999

OTHER PUBLICATIONS

Communication dated Nov. 6, 2014 issued by the Korean Intellectual Property Office in counterpart Korean Application No. 10-2008-0120494.
(Continued)

*Primary Examiner* — Marlon T Fletcher
(74) *Attorney, Agent, or Firm* — Sughrue Mion, PLLC

(57) ABSTRACT

A content play device capable of forming content and a method for forming content thereof. The method for forming content of the content play device, according to an exemplary embodiment of the present invention, comprises providing a content forming user interface (UI) which reflects a plurality of data to be played, receiving a play time of each of the plurality of data via the content forming UI, and forming content in which the plurality of data is reproduced according to a received play time of each data. Accordingly, a user may easily form content in which background music is set for each image file.

20 Claims, 5 Drawing Sheets

(51) Int. Cl.
*G11B 27/031* (2006.01)
*G11B 27/034* (2006.01)
*G10H 1/36* (2006.01)

(56) References Cited

U.S. PATENT DOCUMENTS

| | | | |
|---|---|---|---|
| 6,248,946 | B1 | 6/2001 | Dwek |
| 6,352,432 | B1 | 3/2002 | Tsai et al. |
| 6,392,133 | B1 | 5/2002 | Georges |
| 6,888,999 | B2 | 5/2005 | Herberger et al. |
| 6,894,213 | B2 * | 5/2005 | Saito ................ G06F 3/16 700/94 |
| 7,071,402 | B2 | 7/2006 | Georges |
| 7,227,073 | B2 | 6/2007 | Kim |
| 7,548,934 | B1 | 6/2009 | Platt et al. |
| 7,642,442 | B2 | 1/2010 | Adam et al. |
| 7,663,045 | B2 | 2/2010 | Schmidt et al. |
| 7,754,959 | B2 | 7/2010 | Herberger et al. |
| 7,863,511 | B2 | 1/2011 | McNally |
| 8,153,879 | B2 | 4/2012 | Bunya et al. |
| 9,153,285 | B2 * | 10/2015 | Park ................ G11B 27/034 |
| 2007/0074617 | A1 * | 4/2007 | Vergo ............ G06F 17/30743 84/612 |
| 2007/0074618 | A1 * | 4/2007 | Vergo ................ G10H 1/00 84/612 |
| 2007/0074619 | A1 * | 4/2007 | Vergo ................ G10H 1/42 84/612 |
| 2007/0101355 | A1 | 5/2007 | Chung et al. |
| 2007/0209499 | A1 | 9/2007 | Kotani |
| 2007/0230911 | A1 | 10/2007 | Terasaki |
| 2008/0190266 | A1 | 8/2008 | Kim et al. |
| 2008/0190268 | A1 | 8/2008 | McNally |
| 2008/0195981 | A1 | 8/2008 | Pulier et al. |
| 2008/0232697 | A1 | 9/2008 | Chen et al. |
| 2008/0247458 | A1 | 10/2008 | Sun et al. |
| 2009/0205482 | A1 | 8/2009 | Shirai et al. |
| 2009/0217804 | A1 | 9/2009 | Lu et al. |
| 2010/0172591 | A1 | 7/2010 | Ishikawa |
| 2010/0257994 | A1 * | 10/2010 | Hufford ............ G10H 1/0025 84/609 |

OTHER PUBLICATIONS

Communication dated Jan. 14, 2016, by the Korean Intellectual Property Office in counterpart Korean Patent Application No. 10-2015-0132093 English translation.

* cited by examiner

CONTENT PLAY DEVICE HAVING CONTENT FORMING FUNCTION AND METHOD FOR FORMING CONTENT THEREOF

CROSS-REFERENCE TO RELATED APPLICATION

This application is a continuation of U.S. application Ser. No. 12/549,830 which claims priority under 35 U.S.C. § 119 from Korean Patent Application No. 10-2008-0120494, filed on Dec. 1, 2008 in the Korean Intellectual Property Office, the disclosures of which are incorporated herein by reference in its entirety.

BACKGROUND OF THE INVENTION

1. Field of the Invention

Apparatuses and methods consistent with the present invention relate to a content play device having a content forming function and a method for forming content thereof, and more particularly, to a content play device capable of forming content on its own without an editing program and a method for forming content thereof.

2. Description of the Related Art

A content play device generally plays content which the device has already received. The content may be an image or a music file. If the content is an image file, the content play device displays the image file on the screen, and if the content is a music file, the content play device outputs the sound via a speaker by reproducing the music file. As such, the content play device reproduces a single item of data at a time.

If an editing program is used, however, a plurality of image files can be consecutively displayed on the screen while a music file is reproduced as background music, creating a new content. By doing so, a user may possess a new content which is created by combing an image file with a music file.

The problem is that most editing programs are very expensive and complicated to use. Therefore, even if a user has an editing program, it is very difficult to create content in the way the user wants to using the editing program.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

Exemplary embodiments of the present invention provide a content play device capable of forming content without an editing program by forming content according to a predetermined play time for each data, and a method for forming content thereof.

The method for forming content in a content play device, according to an exemplary embodiment of the present invention, includes providing a content forming user interface (UI) reflecting a plurality of data to be played, receiving a play time of each of the plurality of data via the content forming UI, and forming content in which the plurality of data is played according to the received play time of each data.

The plurality of data may include at least one of a first data and at least one of a second data.

The first data may be an image file and the second data may be a music file.

The content forming UI may include a first data list area which provides a list of the first data and a second data list area which provides a list of the second data.

The list of the first and the second data may be provided in a bar shape.

In providing the content forming UI, the first data list area may be evenly divided according to the number of the first data, and identifying information for each of the first data may be displayed on the divided area. A plurality of first pointers may be displayed on the border of the divided area to change a play time of the first data. The second data list area may be divided according to a play time of the second data, and identifying information for each of the second data may be displayed on the divided area. A plurality of second pointers may be displayed on the border of the divided area to change play time of the second data.

In providing the content forming UI, a play time for each of the first data may be further displayed in the divided area of the first data list area with reference to the entire play time of the second data, and play time of each of the second data may be further displayed in the divided area of the second data list area.

In receiving the play time, a play time added to the originally allocated play time for the first data as the first pointer moves and a play time added to the originally allocated play time for the second data as the second pointer moves may be received.

A content play device, according to an exemplary embodiment of the present invention, comprises a user interface unit which provides a content forming UI reflecting a plurality of data to be played and a content forming unit which forms content to play each of the plurality of data according to a play time received for each data.

The plurality of data may include at least one of a first data and at least one of a second data.

The first data may be an image file and the second data may be a music file.

The content forming UI may comprise a first data list area which provides a list of the first data and a second data list area which provides a list of the second data.

The first and the second list may be provided in a bar shape.

The user interface unit may provide the content forming UI in which the first data list area is evenly divided according to the number of the first data, and identifying information for each of the first data is displayed on the divided area. A plurality of first pointers are displayed on the border of the divided area to change a play time of the first data. The second data list area is divided according to a play time of the second data, and identifying information for each of the second data is displayed on the divided area. A plurality of second pointers are displayed on the border of the divided area to change a play time of the second data.

The user interface unit may provide the content forming UI in which a play time of for each of the first data is further displayed in the divided area of the first data list area with reference to the entire play time of the second data, and a play time of each of the second data is further displayed in the divided area of the second data list area.

The user interface unit may receive a play time added to the originally allocated play time for the first data as the first pointer moves, and a play time added to the originally allocated play time for the second data as the second pointer moves.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
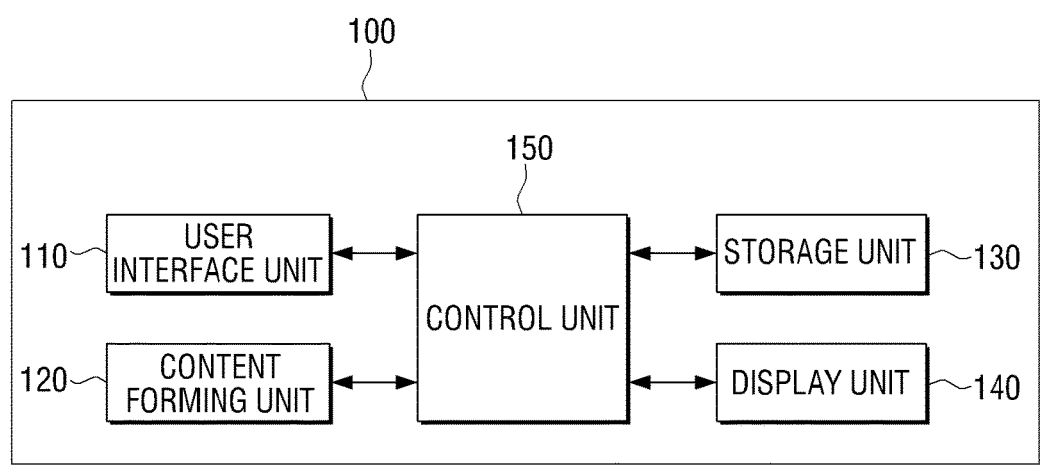
FIG. 1 is a block diagram of a content play device according to an exemplary embodiment of the present invention.

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

FIG. 1 is a block diagram of a content display device according to an exemplary embodiment of the present invention.

Referring to FIG. 1, the content play device 100, according to the exemplary embodiment of the present invention, comprises a user interface 110, a content forming unit 120, a storage unit 130, a display unit 140, and a control unit 150.

The user interface unit 110 receives a request signal to form content from a user. The user interface unit 110 provides a content forming user interface (UI) which reflects a plurality of data to be played, and receives a play time for each of the plurality of data.

The plurality of data includes a first data and a second data. The first data represents an image file and the second data represents a music file. That is, the first data may be files with the extensions of GIF and JPG, and the second data may be files with the extensions of MP3 and WAV.

The user interface unit 110 composes a content forming user interface (UI) which takes a usage pattern of a user into consideration. The content forming UI includes a first data list area for providing a list of the first data and a second data area for providing a list of the second data. The first data list and the second data list are provided in a bar shape.

When composing the content forming UI, the user interface unit 110 divides the first data list area evenly according to the number of the first data, and displays identifying information of the first data in each of the divided areas. The user interface unit 110 divides the second data list area according to the play time of the second data, and displays identifying information of the second data in each of the divided areas. The first and second pointers are displayed on the border of the divided areas of the first and second data list areas to change the play time of the second data.

The content forming UI provided by the user interface unit 110 is explained in detail below with reference to FIGS. 2b and 2c.

The content forming unit 120 forms content in which a plurality of data received from the user interface unit 110 is played according to the play time of each data. In the content formed by the content forming unit 120, a plurality of image files are displayed consecutively according to their play time, and a plurality of music files are played according to their play time.

The storage unit 130 stores information necessary for the content forming device 100. The storage unit 130 stores a plurality of data, that is, the first and second data and content formed by the content forming unit 120.

The display unit 140 displays information which is provided to a user by the content play device 100. The display unit 140 may display the content forming UI composed by the user interface unit 110.

If the content play device 100 is a television, the display unit 140 may be a display panel such as a liquid crystal display (LCD) and a plasma display panel (PDP) which displays an image of broadcasting information.

The control unit 150 controls comprehensive functions of the content play device 100. That is, the control unit 150 controls the input and/or output of signals between the user interface unit 110, the content forming unit 120, the storage unit 130, and the display unit 140.

Figure 2A:
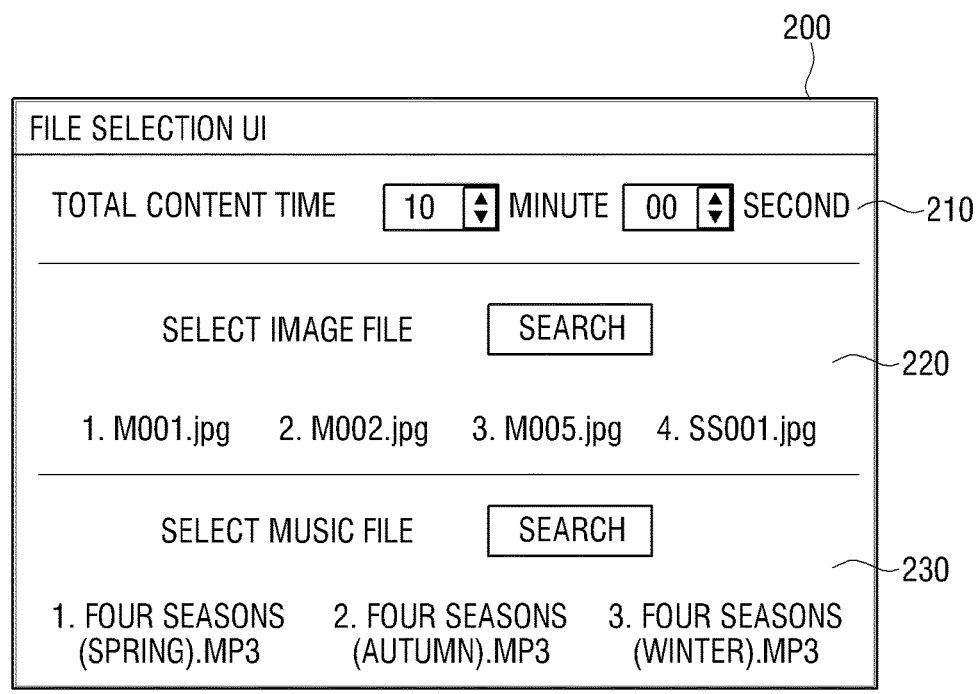
FIGS. 2a, 2b and 2c are schematic views illustrating a user interface (UI) for forming content according to an exemplary embodiment of the present invention.
Figure 2B:
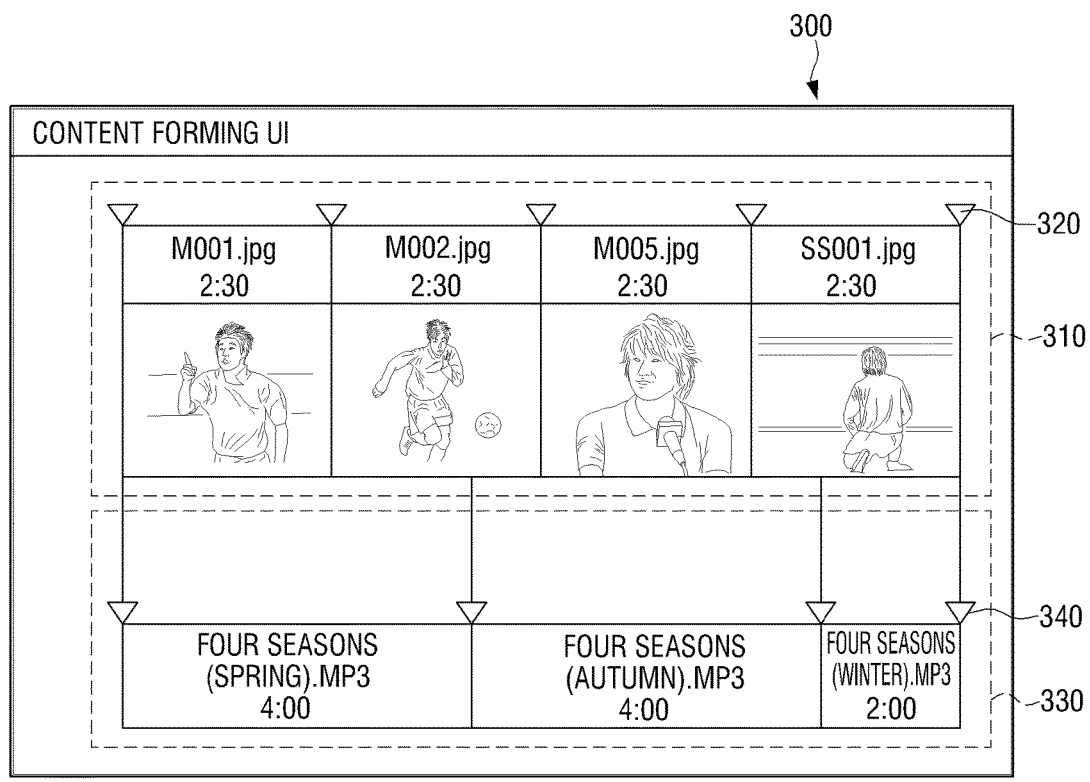
Figure 2C:
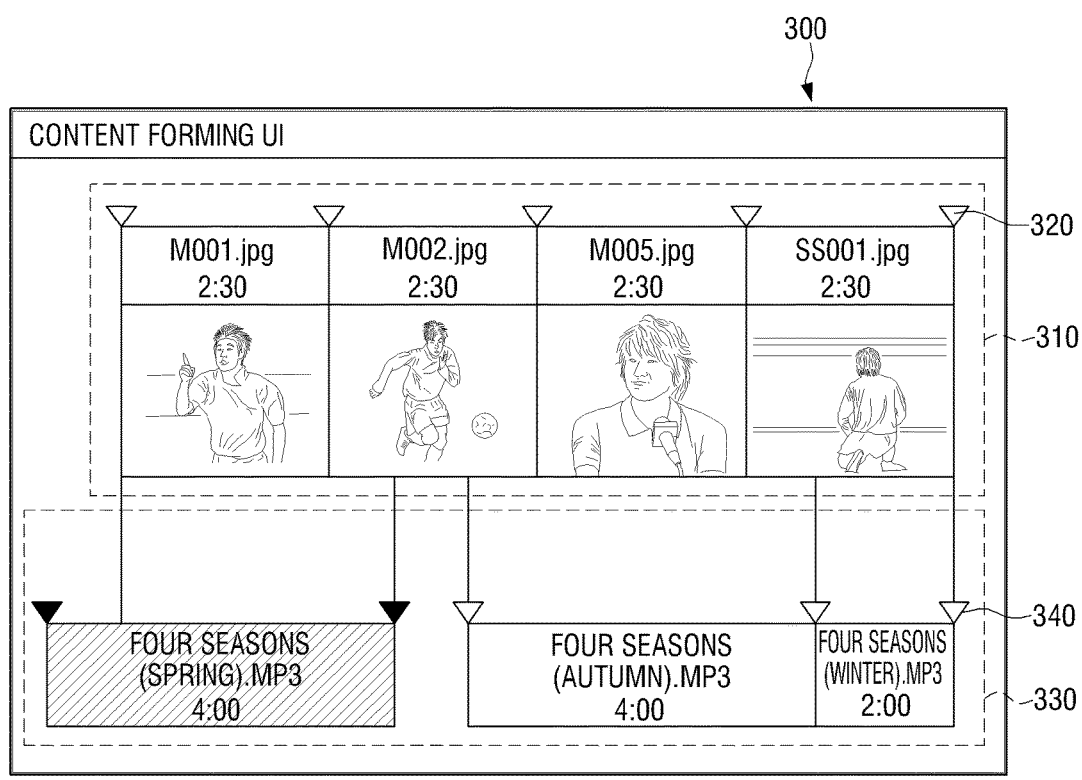

FIGS. 2a, 2b and 2c are schematic views illustrating the content forming UI according to an exemplary embodiment of the present invention.

FIG. 2a illustrates a screen of the file selection UI 200 which is provided to the user if a user requests to form content via the user interface unit 110.

The file selection UI 200 can be divided into an area which sets a total play time of content (210), an area which selects an image file to be included in content (220), and an area which selects a music file to be included in content (230).

In FIG. 2a, a user desires to form content lasting a total of 10 minutes and selects 4 image files and 3 music files, but this is only an example provided to promote a better understanding of the process of data selection.

In FIG. 2a, if the user selects a plurality of image files and music files, the user interface unit 110 composes the content forming UI 300 which directly reflects the selected image files and music files, and displays them via the display unit 140.

As illustrated in FIG. 2b, the content forming UI 300 is divided into the first data list area 310 and the second data list area 330. The first data list area 310 and the second data list area 330 may provide each list in the form of horizontal bar, or the list may be provided vertically so that a play time of each data can be easily compared.

According to an exemplary embodiment of the present invention, the first data list area 310 and the second data last area 330 provide lists horizontally, but this is merely an example, and the lists can be provided vertically.

However, the bars in which the first data list area 310 and the second data list area 330 are provided should face each other in the same length in order to make it possible to compare a play time of the first and second data, and to make it easier to set the second data while the first data is played.

The first data list area 310 is evenly divided according to the number of image files selected by the file selection UI 200 in FIG. 2a. Identifying information of each image file is displayed in each divided area, and the identifying information may be a file name of each image file.

The first pointer 320 is formed on the border of the divided areas of the first data list area 310 to change the play time of the first data. A user may change the play time of the first data by changing the location of the first pointer 320.

For instance, suppose that the first data list area 310 is set to be 10 minutes. Since 4 image files are selected by the file selection UI 200 in FIG. 2a, the first data list area 310 is divided into 4 areas, and the play time of 2 minutes and 30 seconds along with the name of image file is displayed in each divided area. As it may not be easy to identify each image file only by the name of file, a thumbnail of each image file can be further displayed in each divided area.

The second data list area 330 may be divided according to a play time of a music file regardless of the number of music files selected by the file selection UI 200 in FIG. 2a.

If the total play time of the selected music file is less than the time set in the second data list area 330, there will be extra time at the end of the second data list area 330. On the contrary, if the total play time of the selected music files exceeds the time set in the second data list area 330, a part of a music file which is selected for the last time may not be played.

For instance, suppose that the play time of the 3 music files selected by the file selection UI 200 in FIG. 2a is 4 minutes, and the second data list area 330 is set to be 10 minutes. Each of the first 2 music files, which are "four seasons (spring).MP3" and "four seasons (autumn).MP3", takes up four-tenths of the area, and "four seasons (winter).MP3" takes up only two-tenths of the area.

Identifying information of each music file is displayed in each divided area of the second data list area (330). The identifying information of a music file may be the name of file. A plurality of the second pointers (340) are formed on the border of each divided area to change the play time of the music files. A user may change the play time of a music file by changing the location of the second pointer (340) using a mouse.

A user may change the play time of the four image files and the three music files using the content forming UI 300 as illustrated in FIG. 2b. That is, different background music can be set for each image file. Also, only part of a music file can be played.

If a user does not desire to play the front part of "four seasons (spring).MP3", a user may select the divided areas of "four seasons (spring).MP3" using a mouse as illustrated in FIG. 2c. The second pointer 340, which is formed on the border of the divided areas of "four seasons (spring).MP3", becomes a pointer to change a play time of "four seasons (spring). MP3". If a user changes the location of the second pointer 340 in the front part of the divided area of "four seasons (spring).MP3", the corresponding front area of the music file is not played.

As such, by changing the location of the second pointer 340 on the border of the divided area of the music file, a user may set a certain portion of the front or last part of the music file not to be played.

If the play time of an image file or a music file is set as illustrated in FIG. 2c, "M001.jpg", "M002.jpg", "M005.jpg", and "SS001.jpg" are played consecutively for 2 minutes and 30 seconds. During the 2 minutes and 30 seconds that "M001.jpg" is played, "four seasons (spring).MP3" excluding some front part is played, while one-third of "M002.jpg" is displayed, a last part of "four seasons (spring).MP3" is played, while another one-third of "M002.jpg" is displayed, no music is played, and while the last one-third of "M002.jpg" is displayed, the beginning part of "four seasons (autumn).MP3" is played. While the 2 minutes and 30 seconds that "M005.jpg" is displayed, the previously played "four seasons (autumn).MP3" is played until one-third of "SS001.jpg" is displayed, and then "four seasons (winter).MP3" is played for about 2 minutes.

Figure 3:
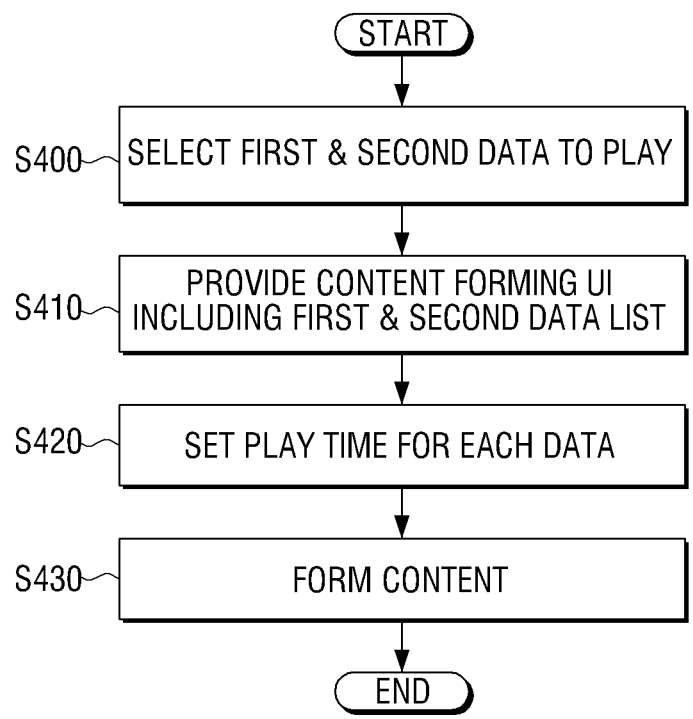
FIG. 3 is a flow chart illustrating a method of forming content according to an exemplary embodiment of the present invention.

FIG. 3 is a flow chart illustrating a method for forming content according to an exemplary embodiment of the present invention.

The method for forming content according to the exemplary embodiment of the present invention will be explained with reference to FIGS. 1, 2a, 2b, 2c, and 3.

If a user requests the content forming device 100 to form content, the request signal to form content is received via the user interface unit 110. The user interface unit 110 displays the file selection UI 200 on the display unit 140, and then the user selects a plurality of data to form content, that is, to select image files and music files using the file selection UI 200 (S400). The file selection UI 200 may have a structure as illustrated in FIG. 2a.

If a plurality of image files and music files are selected via the file selection UI 200, the user interface unit 110 composes the content forming UI 300 including the list of selected image files and music files and displays them on the display unit 140 (S410). The file selection UI 300 may have a structure as illustrated in FIG. 2b.

The user sets a play time for each of the plurality of image files and music files using the first and second pointers in the first and second data list areas included in the content forming UI 300 (S420).

If the play time is set for the plurality of image files and music files by the content forming UI 300, the content forming unit 120 forms content in which the image files and music files are played for the play time set for each file (S430).

As such, the user is provided with the content forming UI 300 in which a list of plurality of image files and music files that the user selected is displayed in a bar shape. The user adjusts play time of an image file referring to the first data list area 310 of the content forming UI 300, and adjusts play time of a music file referring to the second data list area 330.

In short, the user may form content which displays a plurality of image files distinctively while playing different background music for each image file, without using a complicated editing program.

The foregoing exemplary embodiments and advantages are merely exemplary and are not to be construed as limiting the present invention. The present teachings can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An electronic apparatus for providing a content forming function comprising:
   a display; and
   a controller configured to:
      control the display to display a user interface (UI) screen for forming a content,
      display, on a first area of the UI screen, first graphic items respectively associated with a plurality of image contents, each of the first graphic items representing a play time duration for a respective image content,
      display, on a second area of the UI screen, second graphic items respectively associated with a plurality of music contents, each of the second graphic items representing a play time duration for a respective music content, control a play time duration for one of the music contents such that a total play time duration for the music contents corresponds to a total play time duration for the image contents, display a first graphic pointer for adjusting a play time duration for an image content associated with one of the first graphic items, in response to a user input for moving the first graphic pointer, adjust the play time duration for the image content associated with the one of the first graphic items, display a second graphic pointer for adjusting a play time duration for a music content associated with one of the second graphic items, in response to a user input for moving the second graphic pointer, adjust the play time duration for the music content associated with the one of the second graphic items, and form a content based on the image content of which the play time duration is adjusted and the music content of which the play time duration is adjusted, in response to a user input for playing the formed content, play the music contents according to respective play time durations thereof and the image contents according to respective play time durations thereof.

2. The electronic apparatus of claim 1, wherein, in the UI screen for forming the content, a start graphic pointer is located at a starting border of one of the first graphic items and an end graphic pointer is located at an ending border of the one of the first graphic items, and wherein the start graphic pointer and the end graphic pointer for the one of the first graphic items are concurrently displayed and one of a play start time and a play end time for an image file corresponding to the one of the first graphic items is adjusted by a user input moving one of the start pointer graphic and the end graphic pointer.

3. The electronic apparatus of claim 2, wherein, in the UI screen for forming the content, a start graphic pointer is located at a starting border of one of the second graphic items and an end graphic pointer is located at an ending border of the one of the second graphic items, and wherein the start graphic pointer and the end graphic pointer for the one of the second graphic items are concurrently displayed and one of a play start time and a play end time for a music file corresponding to the one of the second graphic items is adjusted by a user input moving one of the start pointer and the end pointer.

4. The electronic apparatus of claim 1, wherein the first graphic items and the second graphic items are provided in a bar shape of which a horizontal size is changed according to the user input moving first graphic pointer for a respective first graphic item or second graphic pointer for a respective second graphic item.

5. The electronic apparatus of claim 1, wherein at least one of the first graphic items includes a thumbnail image with respect to an image file corresponding to the at least one of the first graphic items.

6. The electronic apparatus of claim 4, wherein a horizontal size of at least one of the first graphic items represents play time information with respect to an image file corresponding to the at least one of the first graphic items.

7. The electronic apparatus of claim 4, wherein at least one of the second graphic items includes identification information with respect to a music file corresponding to the at least one of the second graphic item.

8. The electronic apparatus of claim 4, wherein a horizontal size of at least one of the second graphic items represents play time information with respect to a music file corresponding to the at least one of the second graphic items.

9. The electronic apparatus of claim 1, wherein the first graphic items and the second graphic items are provided in a bar shape, and vertically to compare a play time of each data.

10. The electronic apparatus of claim 1, wherein the first graphic pointer is located on at least one of borders of at least one of the first graphic items, and the second graphic pointer is located on at least one of borders of at least one of the second graphic items.

11. A method for forming content in an electronic apparatus, the method comprising:

displaying a user interface (UI) screen for forming a content;

displaying, on a first area of the UI screen, first graphic items respectively associated with a plurality of image contents, each of the first graphic items representing a play time duration for a respective image content, displaying, on a second area of the UI screen, second graphic items respectively associated with a plurality of music contents, each of the second graphic items representing a play time duration for a respective music content, controlling a play time duration for one of the music contents such that a total play time duration of the music contents corresponds to a total play time duration for the image contents, displaying a first graphic pointer for adjusting a play time duration for an image content associated with one of the first graphic items, in response to a user input for moving the first graphic pointer, adjusting the play time duration for the image content associated with the one of the first graphic items, displaying a second graphic pointer for adjusting a play time duration for a music content associated with one of the second graphic items, in response to a user input for moving the second graphic pointer, adjusting the play time duration for the music content associated with the one of the second graphic items, and forming a content based on the image content of which the play time duration is adjusted and the music content of which the play time duration is adjusted, in response to a user input for playing the formed content, play the music contents according to respective play time durations thereof and the image contents according to respective play time durations thereof.

12. The method of claim 11, wherein, in the UI screen for forming the content, a start graphic pointer is located at a starting border of one of the first graphic items and an end graphic pointer is located at an ending border of the one of the first graphic items, and wherein the start graphic pointer and the graphic end pointer for the one of the first graphic items are concurrently displayed and one of a play start time and a play end time for an image file corresponding to the one of the first graphic items is adjusted by a user input moving one of the start graphic pointer and the end graphic pointer.

13. The method of claim 11, wherein, in the UI screen for forming the content, a start graphic pointer is located at a starting border of one of the second graphic items and an end graphic pointer is located at an ending border of the one of the second graphic items, and wherein the start graphic pointer and the end graphic pointer for the one of the second graphic items are concurrently displayed and one of a play start time and a play end time for a music file corresponding to the one of the second graphic items is adjusted by a user input moving one of the start pointer and the end pointer.

14. The method of claim 11, wherein the first graphic items and the second graphic items are provided in a bar shape of which a horizontal size is changed according to the user input moving first graphic pointers for a respective first graphic item or second graphic pointers for a respective second graphic item.

15. The method of claim 11, wherein at least one of the first graphic items includes a thumbnail image with respect to an image file corresponding to the at least one of the first graphic items.

16. The method of claim 14, wherein a horizontal size of at least one of the first graphic items represents play time information with respect to an image file corresponding to the at least one of the first graphic items.

17. The method of claim 14, wherein at least one of the second graphic items includes identification information with respect to a music file corresponding to the at least one of the second graphic items.

18. The method of claim 14, wherein a horizontal size of at least one of the second graphic items represents play time information with respect to a music file corresponding to the at least one of the second graphic items.

19. The method of claim 11, wherein the first graphic items and the second graphic items are provided in a bar shape, and vertically to compare a play time of each data.

20. The method of claim 11, wherein the first graphic pointer is located on at least one of borders of at least one of the first graphic items, and the second graphic pointer is located on at least one of borders of at least one of the second graphic items.

\* \* \* \* \*